United States Patent [19]

Holland

[11] Patent Number: 5,020,103
[45] Date of Patent: May 28, 1991

[54] ADJUSTABLE HEIGHT MOUNTING PEDESTAL FOR PUBLIC AND COIN TELEPHONES

[75] Inventor: Eddie L. Holland, Cumming, Ga.

[73] Assignee: Phillips & Brooks/Gladwin, Inc., Cumming, Ga.

[21] Appl. No.: 527,760

[22] Filed: May 23, 1990

[51] Int. Cl.$^5$ .................. H04M 17/00; H04M 1/11
[52] U.S. Cl. ........................... 379/454; 379/451; 248/125; 248/222.4; 52/27
[58] Field of Search ............... 379/143, 454, 451, 440; 248/125, 222.4, 243; 312/195, 198, 254; 52/27, 40

[56] References Cited

U.S. PATENT DOCUMENTS

| | | |
|---|---|---|
| D. 232,541 | 8/1974 | Bartley et al. |
| 3,225,498 | 7/1962 | Sherron |
| 3,338,002 | 8/1967 | Ericsson et al. |
| 3,511,941 | 1/1967 | Quigley |
| 3,752,927 | 8/1973 | Bartley et al. |
| 4,246,451 | 1/1981 | Nix ........................... 379/451 |
| 4,254,308 | 3/1981 | Blomeyer et al. ............. 379/454 |
| 4,396,176 | 8/1983 | Hannula |

*Primary Examiner*—Stafford D. Schreyer
*Attorney, Agent, or Firm*—Jones, Askew & Lunsford

[57] ABSTRACT

An adjustable height mounting pedestal for public or coin telephones comprises a tubular post having a plurality of knockouts at varying heights ranging from a drive-up curbside height to a standard handicap access height. A backboard mounting enclosure includes an opening therein that conforms to the peripheral configuration of the telephone for which the mounting is adapted. The configuration of the backboard extends about the telephone housing forward of the rear edge of the front housing of the telephone so as to protect the telephone from prying tools. The backboard and post include dividers for dividing the space within the backboard and post into electrically isolated channels for telephone wiring and for power wiring. Adjustable channels fit within selected knocked-out openings in the post when a particular height for the backboard is selected. The mounting channels and backboard are temporarily supported during assembly, to facilitate assembly by a single worker. The mounting post allows mounting of at least one backboard and telephone at a selectively variable height, and also allows the mounting of a second backboard and telephone to the opposite side of the post.

24 Claims, 6 Drawing Sheets

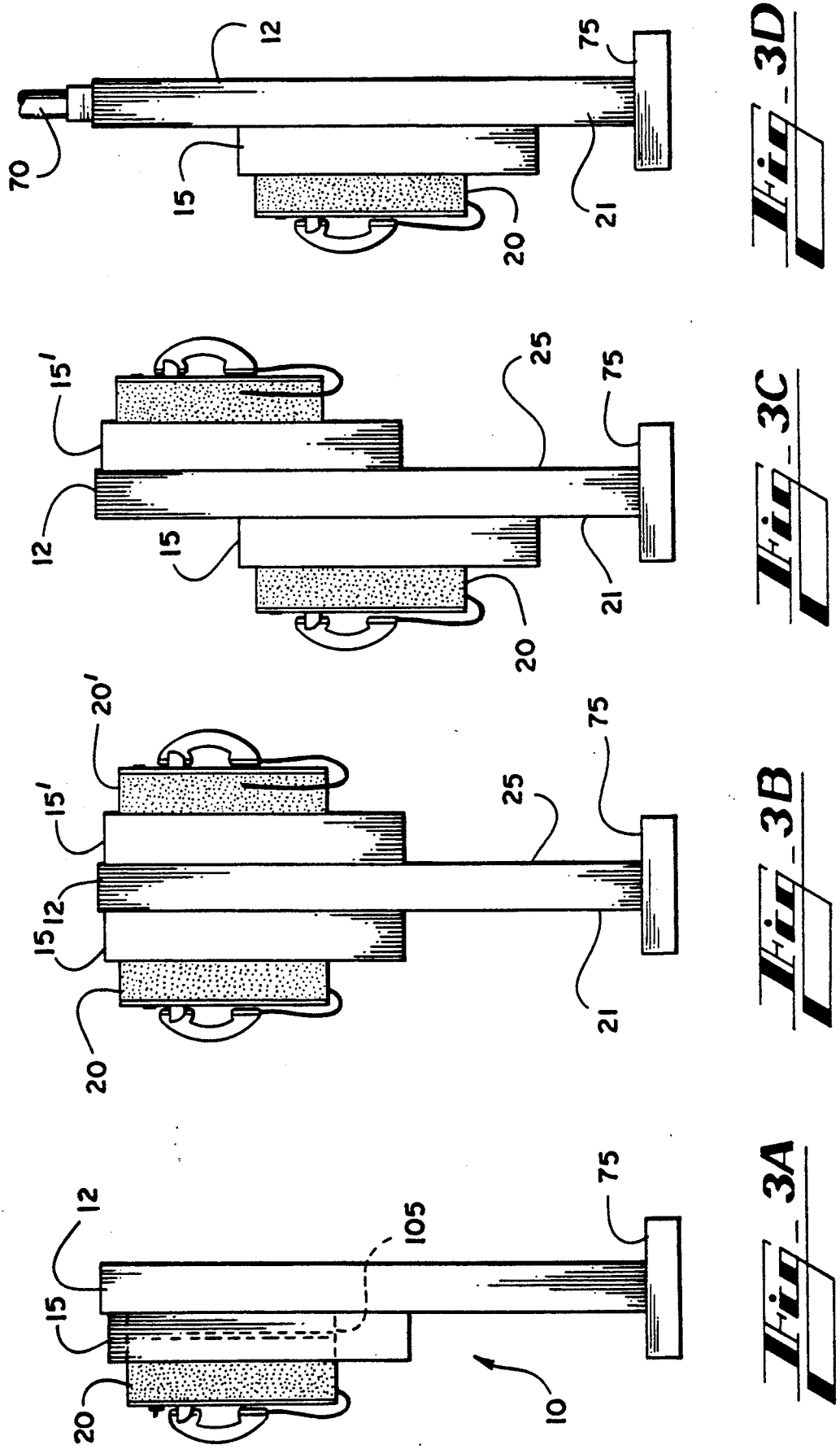

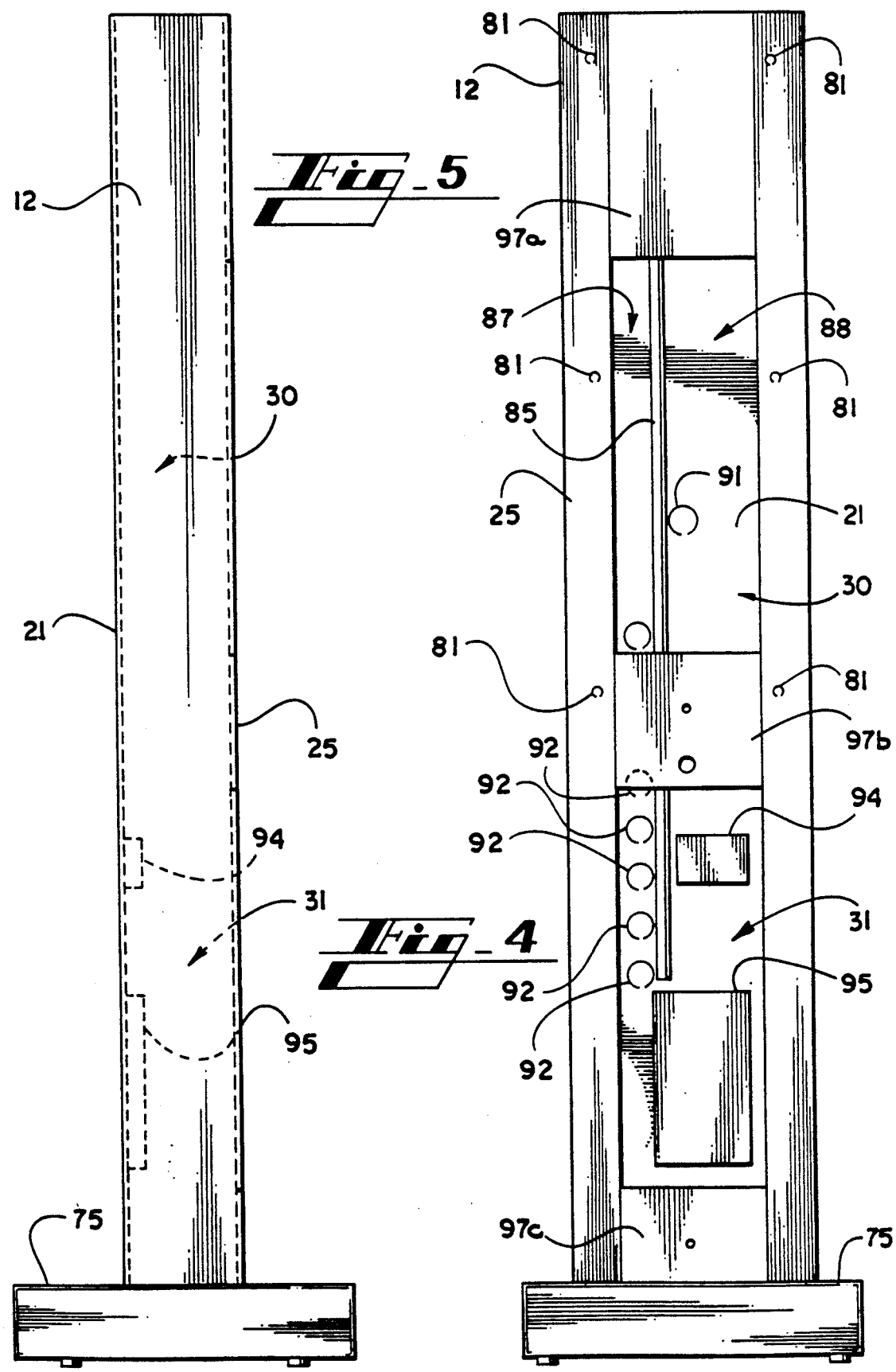

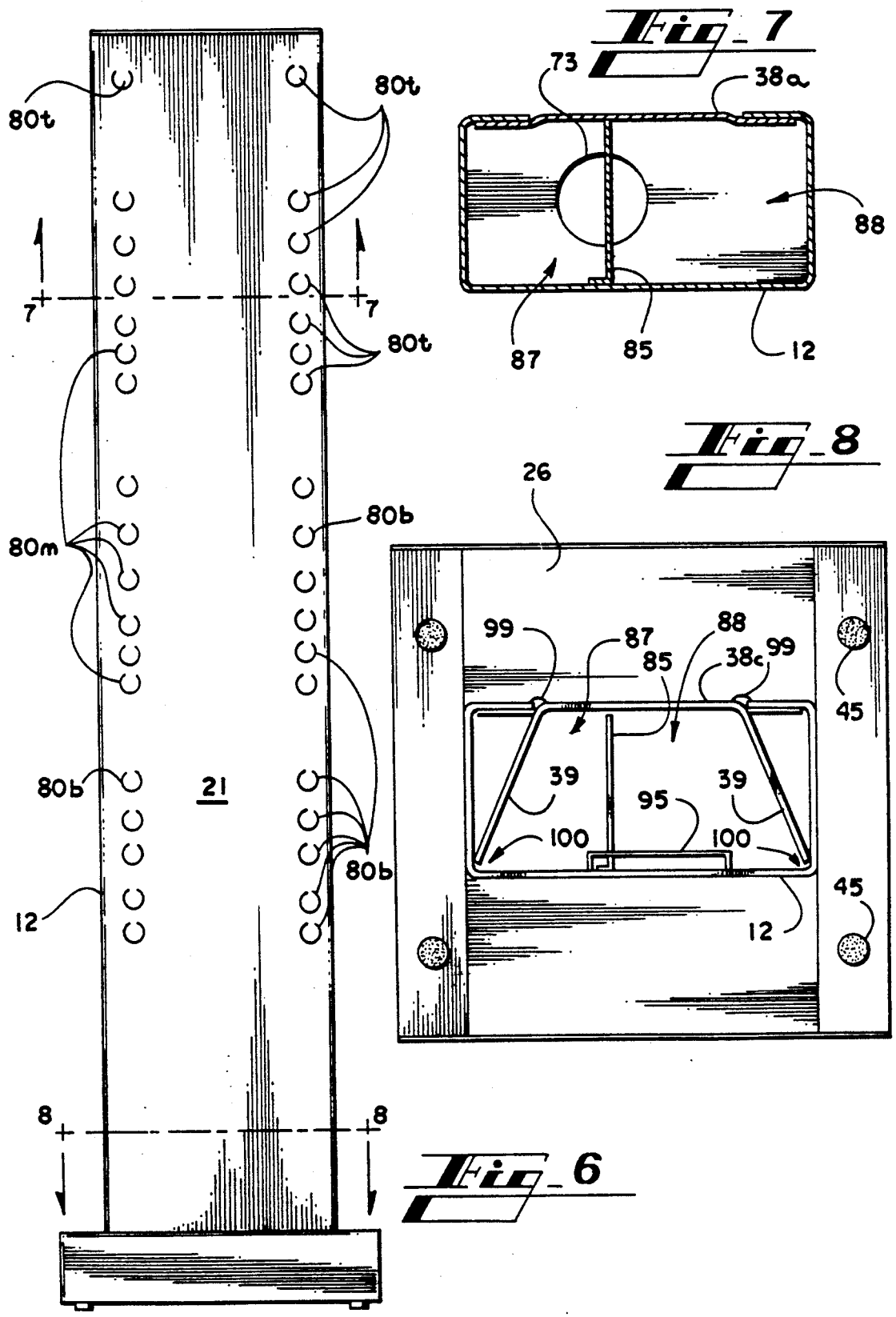

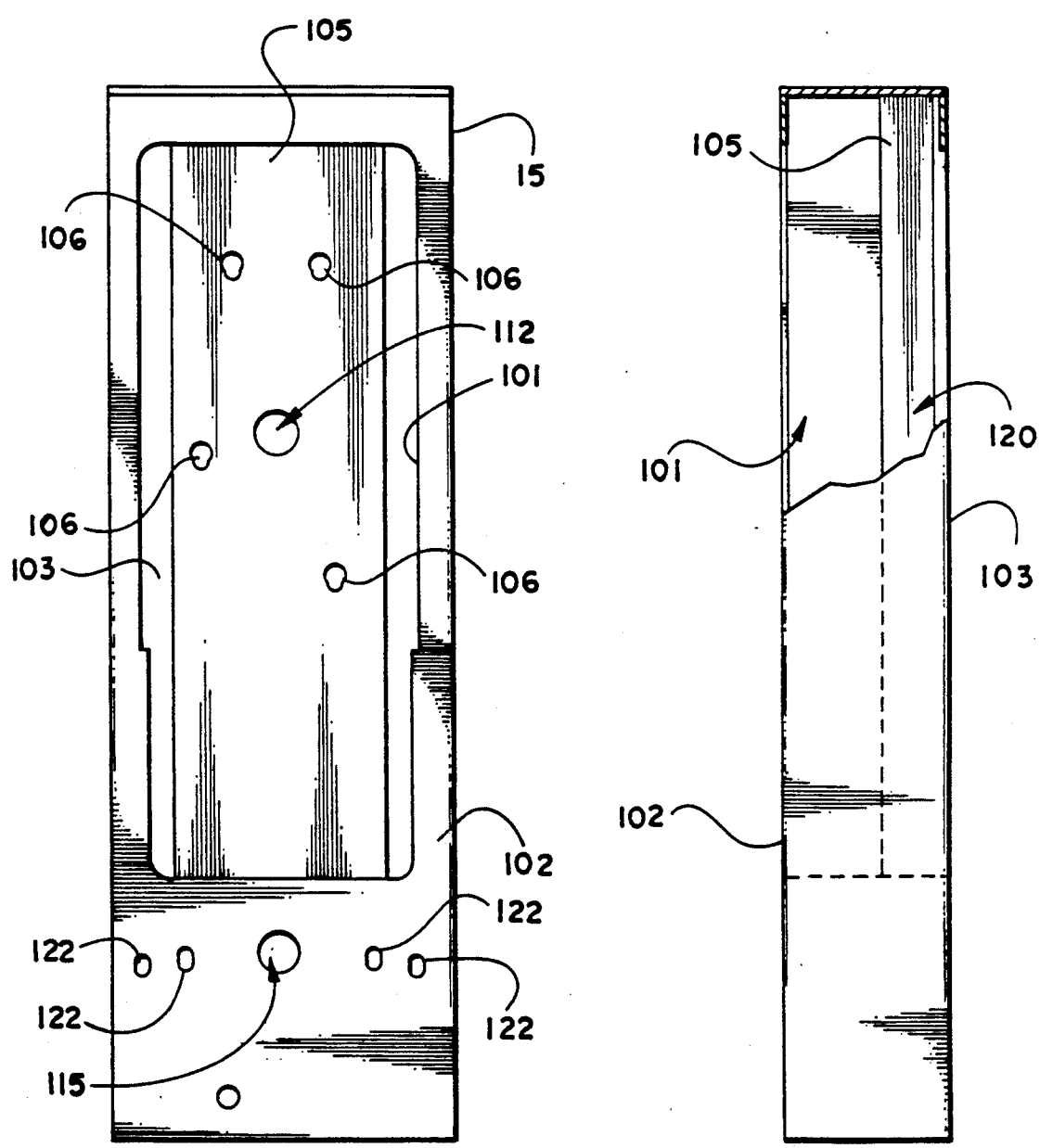

ADJUSTABLE HEIGHT MOUNTING PEDESTAL FOR PUBLIC AND COIN TELEPHONES

TECHNICAL FIELD

The present invention relates generally to public or coin telephone mounting arrangements, and relates more particularly to an adjustably variable height mounting post or pedestal suitable for use in walk-up and drive-up public or coin telephone applications.

BACKGROUND

Outdoor telephone booths and pedestals are popular for use in strip-type shopping centers, malls, and other public businesses and other facilities as mountings for public or coin telephones. Many current telephone mounting arrangements are purchased and installed by building contractors and property owners rather than by telephone companies. In addition, many public or coin telephones are owned by property owners rather than by telephone companies, and the proceeds from operation of such telephones are retained by the property owner.

There is a variety of different applications for public or coin telephones in such facilities. For example, telephones are often provided in close proximity to buildings or other structures. A typical single-height mounting arrangement is shown in U.S. Pat. No. 3,752,927 and U.S. Pat. Des. 232,541 to Bartley et al. In other applications, telephones are provided for drive-up use, either in a curbside mounting or directly installed on the pavement of a parking lot. Curbside mounting for drive-up use is typically a lower mounting than a pavement mounting because of the height added by the curb. Additionally, in high density applications it is sometimes desirable to provide for two telephones mounted back to back. Yet still further, in some applications it is required to provide for a mounting of a telephone at standard handicap access height.

Prior to the present invention, each of these different outdoor applications has required a separate type of mounting arrangement to accommodate the varying height requirements. For heavy users of public or coin telephone mountings, this has necessitated inventory storage of several different types of mounting arrangements.

Additionally, it is known that outdoor telephone mounting arrangements placed at public locations are often susceptible to destruction by vandals or theft. There is considerable loss of money by telephone companies and private owners of the telephones as a result of such vandals and thieves who break into coin boxes of the telephones or remove the entire telephone assembly from the telephone booth mounting assembly when burglarizing. Accordingly, it is further important to prevent or delay unlawful attempts to remove or break into the telephone assembly.

Typical of such arrangements is U.S. Pat. No. 3,511,941 to Quigley, which employs a support wall, a mounting plate, and a partially-surrounding enclosure, and means for affixing the telephone to the mounting plate independently of enclosure. The above-mentioned Bartley et al. U.S. Pat. No. 3,752,927 describes an arrangement whereby the juncture between the rear edge of the front housing of the telephone and front edge of the back housing of the telephone is protected inside the mounting post, to make it more difficult to pry into the telephone housing.

However, there is a need for an improved mounting system for public or pay telephones which is secure in the sense that vandalism and theft is discouraged, yet which is flexible and versatile in configuration such that a wide variety of mounting arrangements including variable height and back-to-back mountings are convenient.

SUMMARY OF THE INVENTION

Public or coin telephone mounting arrangements constructed in accordance with the present invention are provided with secure mounting means which allow fastening of the telephone in a secure manner to a mounting pedestal so they cannot be removed easily. Moreover, these mounting arrangements are constructed with an attractive rectangular pedestal design which provides for a variable height mounting on at least one side of the pedestal to facilitate provision mounting at heights for curbside or pavement drive-up use, handicapped access, or conventional pedestrian use, either in single telephone configurations or in back-to-back arrangements.

Briefly described, the present invention comprises a tubular mounting pedestal or post including front and back walls spaced apart from one another. At least one of the front or back walls includes a plurality of knock-outs which are preformed during fabrication. These knock-outs are removed in a predetermined arrangement during assembly so as to allow mounting of a telephone backboard mounting enclosure at one of a plurality of heights corresponding to the selected arrangement of knock-outs. The backboard mounting enclosure allows mounting of a public or coin telephone in a secure manner, and at the selected one of a plurality of heights.

The entire pedestal assembly can be assembled by a single worker. The pedestal includes a temporary support pin on the interior of the pedestal for temporarily supporting at least one adjustable channel during assembly. The adjustable channel includes integral threaded studs which extend through the selected knock-out holes and into the backboard mounting enclosure. The backboard mounting enclosure is then fastened to the channels on the pedestal at the selected height.

The backboard mounting enclosure includes an opening that conforms to the peripheral configuration of the public or coin telephone for which the mounting is adapted. The telephone then is mounted to the backboard so that the front wall of the backboard surrounds the periphery of the telephone a distance forward of the rear surface of the telephone. The juncture between the edges of the telephone housing is thereby encased in the backboard and protected from prying tools.

More particularly described, the present invention is an improved adjustable height mounting pedestal for mounting a public or coin telephone comprising an elongate upright tubular post. The upright post includes at least one temporary channel holding pin extending into the interior of the upright post at a position suitable for temporarily supporting a backboard mounting channel.

The upright post includes a plurality of variably spaced knock-outs, the spacing of the knock-outs being such that removal of a predetermined set of knock-outs provides a set of selected mounting holes for a backboard mounting enclosure at one of a plurality of predetermined mounting heights for the telephone. The upright post further comprises a first wiring divider means for dividing the space on the inside of the upright post into a power wiring channel and a telephone wiring channel. The first wiring divider means extends the length of the upright post from the top of the upright post to a lower position toward the bottom of the upright post. A base means is provided for affixing the upright post to a horizontal mounting surface, such as a curb, sidewalk, or parking lot pavement.

A backboard mounting enclosure is provided for mounting the telephone in a secure manner. The backboard mounting enclosure includes a second wiring divider means in the backboard mounting enclosure for dividing the space on the inside of the backboard mounting enclosure into a power wiring channel and a telephone wiring channel. The second wiring divider means extends the length of the backboard mounting enclosure from the top of the backboard mounting enclosure to a lower position toward the bottom of the backboard mounting enclosure. This arrangement provides a separate wiring channels for power wires and for telephone wires in both the pedestal and the backboard mounting enclosure, at all possible mounting heights.

At least one adjustable height backboard mounting channel is provided for supporting the backboard mounting enclosure and associated telephone on the upright post. The mounting channel is generally U-shaped and includes at least one permanent threaded mounting stud and at least one temporary mounting hole. The temporary mounting hole is positioned to hang onto a temporary channel holding stud or pin in the upright post and temporarily support the backboard mounting channel when the backboard mounting channel is placed into the interior of the upright post at a position corresponding to a selected height for the backboard mounting enclosure. The threaded mounting studs extend through selected knocked-out mounting holes in the upright post and into the backboard mounting enclosure when the backboard mounting channel is temporarily supported in the interior of the upright post by the temporary channel holding pin. Threaded nuts securely hold the backboard mounting enclosure to the backboard mounting channel and the upright post when the threaded studs are tightened.

The preferred backboard mounting enclosure comprises a back wall and a front wall, the front wall including an opening for receiving a public or coin telephone. The opening is shaped to closely conform to the outer peripheral configuration of the telephone housing. A support plate is affixed to the back wall, and the rear housing of the telephone is secured to the support plate. The support plate extends generally parallel to the front wall. The spacing between the support plate and the front wall is greater than the spacing between the rear housing of the telephone and the rear edge of the front housing of the telephone, so that the juncture between the rear housing and the front housing of the telephone is protected inside the backboard mounting enclosure.

Accordingly, it is an object of the present invention to provide an improved mounting pedestal for public or coin telephones.

It is another object of the present invention to provide an adjustable height mounting pedestal for public or coin telephones.

It is another object of the present invention to provide an improved mounting pedestal for public or coin telephones which allows back-to-back mounting of two telephones, at least one of which can be at a selectively variable height.

It is another object of the present invention to provide an improved secure mounting pedestal for public or coin telephones which maintains separation between electrical power wiring for lighting and other utilities in the mounting pedestal and wiring for the telephone itself.

It is another object of the present invention to provide a novel method and mounting structure facilitating the mounting of a public or coin telephone and its associated enclosure at variable heights, in a manner such that only one person can mount and assemble the telephone and its enclosure in a secure manner.

It is another object of the invention to provide an adjustable height telephone mounting pedestal which allows mounting at heights ranging from a standard universal handicap access height of 54 inches, to a normal drive-up height of 48 inches for use in a parking lot when the pedestal is out on the flat pavement, to a curb-side mounting of 40 inches for a drive-up type installation where the pedestal is mounted on a curb.

It is another object of the present invention is to provide a standardized mounting post and backboard which allows mounting arrangements at varying heights without requiring inventory of different height mounting posts or pedestals for different height mounting requirements.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3, consisting of FIGS. 3A–3D, are side views of the preferred adjustable height mounting pedestal shown in FIG. 1, illustrating various mounting configurations of a single telephone mounting, back-to-back mountings at the same height, back-to-back mountings at different heights, and a single mounting at a lowered height, respectively.

FIG. 4 is a front plan view of the adjustable-height mounting pedestal employed in the preferred embodiment of FIG. 1, shown without any of the panels or other elements attached thereto.

FIG. 5 is a side plan view of the adjustable-height mounting pedestal of FIG. 4.

FIG. 6 is a rear plan view of the adjustable-height mounting pedestal of FIG. 4.

FIG. 7 is a sectional view taken along the line 7—7 of FIG. 6 showing the interior construction of upper end of the adjustable-height mounting pedestal.

FIG. 8 is a sectional view taken along the line 8—8 of FIG. 6 showing the interior construction of the lower end of the mounting pedestal and mounting base.

FIG. 9 is a front plan view of the backboard mounting enclosure employed in the preferred embodiment of FIG. 1, without the telephone or any associated parts.

FIG. 10 is a side plan view of the backboard of FIG. 9, partially broken away to show the interior construction of the mounting support plate for the telephone.

FIG. 11 is a top plan view of the backboard of FIG. 9, partially broken away to show the interior construction of the mounting support plate.

FIG. 12 is a sectional view taken along the line 12—12 of FIG. 1 showing the interior construction of the assembled backboard and pedestal.

DETAILED DESCRIPTION OF THE PREFERRED EMBODIMENT

Figure 1:
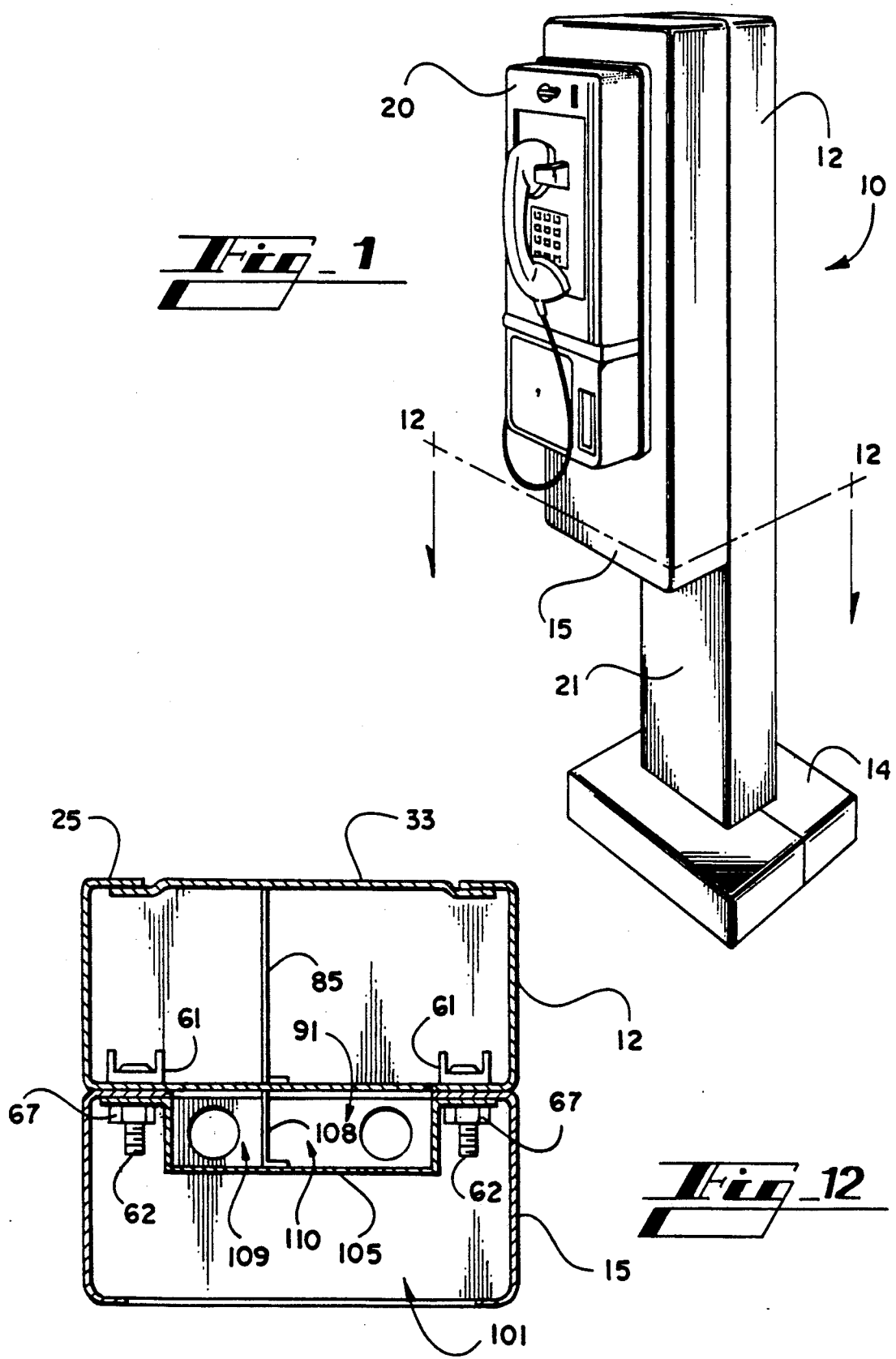
FIG. 1 is a front perspective view of an adjustable height telephone mounting pedestal constructed in accordance with the preferred embodiment of the present invention.

Referring now to the drawings, in which like numerals illustrate like elements throughout the several drawing figures, FIG. 1 illustrates the preferred embodiment of an adjustable height mounting pedestal 10 constructed in accordance with the present invention. The mounting pedestal comprises a generally rectangular tubular steel post 12 which is mounted firmly to a base 14. A backboard mounting enclosure or "backboard" 15 is provided for mounting of a public or coin telephone 20. The backboard 15 is mountable on the post 12 at a selectively variable height from 40 inches for curbside drive-up use to 54 inches for walk-up use, in ranges of 2 inches. The post 12 will accommodate mounting of a single backboard 15 on the front side 21 as shown in FIG. 1 and FIG. 3A, but will also accommodate mounting of a second backboard 15' on the back side as shown in FIGS. 3B and 3C.

Figure 2:
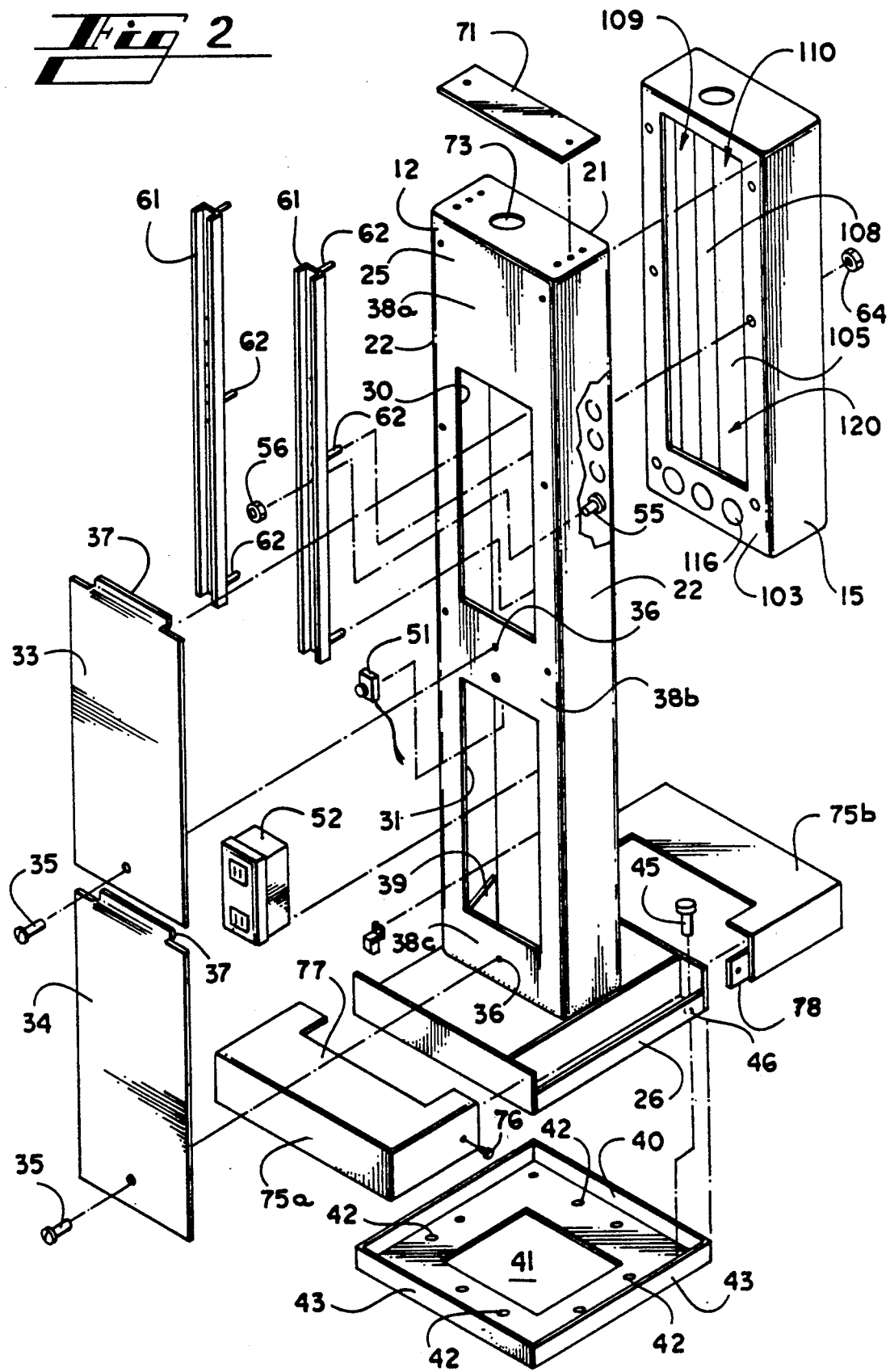
FIG. 2 is an exploded front perspective view of the preferred adjustable height mounting pedestal of FIG. 1, with the various panels and elements removed from the pedestal.

Referring next to FIG. 2, the post 12 is a generally rectangular tubular steel post having a front side or wall 21, side walls 22, and a back side or wall 25. The back wall 25 includes a pair of rectangular service openings, with a top opening 30 and a bottom opening 31. A top service cover 33 and a bottom service cover 34 are provided for the service openings 30, 31 respectively. The covers 33, 34 each include flanged hinges 37, and are held in place with screws 35 which are received in threaded openings 36 in the back wall 25. The service openings 30, 31 are defined by bridging plates 38a, 38b, 38c. As shown in FIG. 8, the bottom plate 38c includes angled flanges 39 that extend into the interior of the post 12 to provide additional transverse stability.

The post 12 is mounted to the ground via a base pan 40 which is generally square and includes a square opening 41 in the center for entry of conduit. The base pan 40 includes a plurality of mounting holes 42. During assembly, the base pan is used as a template to locate the post, with the holes 42 being used to mark for drilling into a mounting surface for providing fasteners such as concrete bolts or the like. Holes are drilled in the mounting surface and appropriate ½-inch fasteners such as anchor bolts (not illustrated) are employed for in-ground mounting.

The post 12 includes a generally square base member 26 welded to the bottom thereof. The base member 26 fits within a recess defined by flanges 43 which extend around the perimeter of the base pan 40, and includes openings 46 with threaded inserts pressed therein for receiving leveling bolts. After the post and base member are positioned in the base pan, leveling bolts 45 extend through the threaded openings 46 and into contact with the base pan 40, allowing leveling adjustment of the post 12. The pan 40 is "sandwiched" between the base 26 and ground, and the base member 26 of the post 12 is then secured to the base pan 40 with ½-inch screws (not shown) or other suitable fastening means to hold the post securely to the ground.

Still referring to FIG. 2, after the post 12 is erected, an optional photoelectric light control 51 for automatically illuminating signage associated with the telephone or an associated booth, an optional circuit breaker 52 with integral duplex receptacle to provide overload protection and service disconnect if required by local electrical codes, or other utility (not shown) may be affixed on suitable mounting brackets 94, 95 (FIGS. 4, 5) inside the post 12, through the service openings 30, 31, prior to fastening the covers 33, 34.

Either before or after the post 12 is affixed to the ground, mounting, telephone line, and power line knock-outs may be removed. Referring now to FIG. 6, it will be seen that a plurality of variable height knock-outs 80 are provided, so that the backboard may be mounted at one of a plurality of selected mounting heights. For example, in the preferred embodiment, knock-outs for mounting heights of 40, 42, 44, 46, 48, and 54 inches are provided. Three vertical knock-outs are required on each side of the post 12 for a selected mounting height, to accommodate three threaded studs 62 of adjustable height channels 61, for a total of six (6) knock-outs for a mounting. Accordingly, knock-outs 80b, 80m, 80t are provided in the preferred embodiment for mounting holes corresponding to bottom, mid, and top mounting holes, respectively, at heights corresponding to 40, 42, 44, 46, 48, and 54 inch mountings for the backboard.

When considering appropriate mounting heights, it will be understood that normal drive-up height for pavement mounting is 48 inches. Curbside drive-up height is typically 40 or 42 inches, for typical 6–8 inch curbs. Standard walk-up pedestrian height is 54 inches, which allows handicap access.

Returning now to FIG. 2, after appropriate mounting knock-outs have been removed for a selected mounting height, a pair of adjustable height U-shaped channels 61 are then inserted through the top opening 30 of the post 12. The channels 61 include threaded studs 62 which are welded onto the channels, for supporting a backboard mounting enclosure 15. However, during assembly the adjustable channels 61 are first hung inside the post on a temporary channel holding threaded stud or pin 55 which is affixed on the inside of the post 12 and extending into the interior of the post. The channels 61 are temporarily and loosely secured at a selected height on the pins 55 with a #10–32 nut 56. The nut 56 is preferably not tightened and is provided only to loosely retain the channel in the selected knock-outs until the backboard 15 is installed.

When the channels 61 are temporarily supported on the pins 55, the threaded studs 62 will protrude through the front wall 21 of the post 12, at the appropriate selected heights. The backboard 15 is then hung onto the protruding threaded studs 62. It will therefore be appreciate that the entire assembly including hanging the backboard 15 on the post 12 can be effected by a single worker since there is no requirement that one worker support the backboard 15 while the other worker inserts nuts and bolts to affix the backboard to the post. The backboard 15 is secured to the studs 62 using six ⅜-16 nuts 67, as best seen in FIG. 12.

At this stage during the assembly, if a mast 70 (FIG. 3D) is required for provision of aerial power or telephone service, the post 12 includes a top cover 71 (FIG.

2) which may be removed to reveal a mast-receiving opening 73, through which the mast 70 would be inserted and fastened.

After completion of these stages and appropriate interior wiring, the top service cover 33 and bottom service cover 34 may be positioned and fastened with screws 35. Base covers 75a, 75b are then placed around the base member 26 and over the base pan 40 to cover same, and fastened with a screw 76 or other suitable fastening means to the base member 26. The base covers 75a, 75b are of similar construction and include a cut-out 77 for fitting around the post 12 and a flange 78 on the base cover 75b which fits behind the corresponding opening in the base cover 75a for receiving the screw 76, which threads into a hole in the base member 26.

Turning next to FIGS. 4 and 5, it will be seen that on the back wall 25 of the post 12 there is preferably provided a second plurality of knockouts 81 which allow mounting of a second backboard mounting enclosure 15' at a 54 inch height. Typical arrangements for mounting of backboards on both sides of the post 12 are shown in FIG. 3B and 3C.

As best seen in FIG. 4, the post 12 further includes a divider channel 85 welded to the inside front wall 21 of the post, extending from the top of the post to a distance about halfway in the bottom service opening 31. The divider 85 defines two separate wiring channels, one for power lines 87 and one for telephone service 88, so as to provide electrical isolation between these two different services. A single knockout 91 is provided on the right side of the divider 85 for providing a telephone wiring passageway to a mounted backboard.

Only one knockout 91 is provided in the preferred embodiment for telephone wiring because the backboard 15 includes a corresponding isolated telephone wiring channel and a plurality of knock-outs is not necessary. Accordingly, a plurality of power knock-outs 92 are provided in the front wall 21 to mate and align with a corresponding power line opening in the backboard.

Raised mounting brackets 94, 95 are welded to the inside of the front wall 21 for mounting a station protector (not illustrated) and circuit breaker 52, respectively, if required. A station protector, as will be knwon, provides surge protection for the telephone signal circuit.

Referring now to FIGS. 7 and 8, the divider 85 completely divides the post 12 into the two separate channels 87, 88 extending a substantial length of the post 12. FIG. 8 shows how the bridging plate 38c extends across the width of the post 12 between weldments 99, and how the angled flanges 39 extend from the weldments 99 to the opposite corners 100 of the post to provide lateral stability.

Referring to FIG. 9, the backboard mounting enclosure 15 comprises a opening 101 sized and shaped to closely conform to the outer peripheral configuration of the housing for the public or coin telephone for which the mounting is adapted. To the rear of the opening and intermediate the front wall 102 and back wall 103 is a welded support plate 105 to which the telephone is fastened in the conventional manner. Slotted keyways 106 are provided to support the telephone housing (not shown) until fastened with screws.

The support plate 105 is generally U-shaped and is spaced apart from the back wall 103 by a predetermined distance such that when the telephone housing (not shown in FIG. 9) is secured to the support plate 105, the walls of the backboard 15 surround the top, bottom, and sides of the telephone but forward of the rear edge of the housing of the telephone. As a result, the juncture between the rear edge of the front housing of the telephone with the front edge of the rear housing is protected inside the backboard and is not accessible for attack by a crow-bar or other prying tool, in the manner as shown and described in U.S. Pat. No. 3,752,927, as shown in phantom in FIG. 3A.

The backboard 15 further includes mounting holes 122 positioned toward the bottom for mounting a shelf and other accessories associated with the telephone.

Referring now to FIG. 11, the support plate 105 is welded at points 107 to the back wall 103 of the backboard 15 and is divided into a pair of channels 109, 110 for providing separate electrically isolated wiring channels for electrical service and telephone service to the telephone. A divider 108 divides the support plate 105 into the channels 109, 110.

An opening 112 (FIG. 9) is provided in the support plate 105 for entry of telephone service wiring from the post when mounted. A power wiring opening 115 is provided in the lower portion of the front wall 102 of backboard 15. The opening 115 aligns with an opening in a phone booth (not shown) which may be affixed to the backboard and pedestal for signage lighting. As seen in FIG. 2, corresponding power wiring openings 116 are provided on the back wall 103 of the backboard 15, which align with one of the power wiring openings 92 (FIG. 4) when the backboard is mounted, so that power wiring for lighting of the pedestal can follow as direct a route as possible from the circuit breaker, through power wiring channel 87 in the post 12, through a power wiring opening 92 at a selected height, and to the opening 116 in the front wall of the backboard 15.

As perhaps best seen in FIGS. 2 and 11, the back wall 103 of the backboard 15 includes an opening 120 for entry of telephone from the post 12. The opening 120 extends substantially the entire length and width of the support plate 105 (except of course where welded to the back wall of the backboard), and thereby provides very wide and open access for wiring from the post 12.

It will thus be seen that the support plate 105 and its corresponding divider 108 define the channels 109, 110 extending the length of the opening 120, which channels are closed off when the backboard 15 is affixed to the post 12. Once the backboard is mounted to the post, the only access to the channels 109, 110 is via the opening 91 (FIG. 4) for telephone wiring and a selected knocked-out one of the openings 92 for power wiring. It will be thus be appreciated that both the post 12 and the backboard 15 provide corresponding parallel wiring channels which are electrically isolated from each other. It will also be appreciated that the opening 120 exposes the channels 109, 110 along a long expanse of the back wall 103, thereby permitting flexible positioning of the backboard 15 with respect to wiring service provided into the channels without the need for additional metal and knockouts.

Accordingly, it will now be appreciated that there is a complete vertical separation of telephone and power wiring extending from the backboard 15, into the post 12, from the top of the post 12 down to the circuit breaker, so as to isolate 110 volt power wiring from telephone wiring to provide for isolation from electromagnetic interference and also to minimize shock hazards to persons assembling or servicing the assembly.

The preferred embodiment of the present invention has been disclosed by way of example and it will be understood that other modifications may occur to those skilled in the art without departing from the scope and the spirit of the appended claims.

What is claimed is:

1. An improved mounting pedestal for mounting a public or coin telephone, comprising:
   an elongate upright tubular post for mounting to a mounting surface;
   variable height mounting means on said upright post for mounting a backboard mounting enclosure at a selectively variable height; and
   a backboard mounting enclosure for mounting said telephone in a secure manner at a selected height on said upright post with said variable height mounting means.

2. The improved mounting pedestal of claim 1, wherein said upright post comprises a temporary channel holding pin on the interior thereof, and further comprising at least one backboard mounting channel, said backboard mounting channel being generally U-shaped and including at least one permanent mounting stud and at least one temporary mounting hole,
   said temporary mounting hole being positioned to receive said temporary channel holding pin in said upright post and temporarily support said backboard mounting channel when said backboard mounting channel is placed into the interior of said upright post at a position corresponding to a selected height for said backboard mounting enclosure,
   said at least one permanent mounting stud extending through a mounting hole in said upright post when said backboard mounting channel is temporarily supported in the interior of said upright post by said temporary channel holding pin, for receiving and supporting said backboard mounting enclosure.

3. The improved mounting pedestal of claim 2, further comprising means for securely holding said backboard mounting enclosure to said permanent mounting stud on said backboard mounting channel.

4. The improved mounting pedestal of claim 1, wherein said variable height mounting means comprises a plurality of variably spaced knock-outs in said upright post, the spacing of said knock-outs being such that removal of a predetermined set of knock-outs provides a set of selected mounting holes for said backboard mounting enclosure at one of a plurality of predetermined mounting heights for said telephone.

5. The improved mounting pedestal of claim 1, further comprising leveling base means for affixing said upright post to said mounting surface in a level position.

6. The improved mounting pedestal of claim 1, wherein said upright post comprises a first wiring divider means for dividing the space on the inside of said upright post into a power wiring channel and a telephone wiring channel, said first wiring divider means extending the length of said upright post from the top of said upright post to a lower position toward the bottom of said upright post;

7. The improved mounting pedestal of claim 1, wherein said backboard mounting enclosure comprises a second wiring divider means in said backboard mounting enclosure for dividing the space on the inside of said backboard mounting enclosure into a power wiring channel and a telephone wiring channel, said second wiring divider means extending the length of said backboard mounting enclosure from the top of said backboard mounting enclosure to a lower position toward the bottom of said backboard mounting enclosure.

8. The improved mounting pedestal of claim 1, wherein said backboard mounting enclosure comprises:
   a front wall including an opening for receiving a public or coin telephone, said opening being shaped to closely conform to the outer peripheral configuration of said telephone;
   a back wall; and
   a support plate affixed to said back wall to which the rear housing of said telephone is secured, said support plate extending generally parallel to said front wall,
   the spacing between said support plate and said front wall being greater than the spacing between the rear housing of said telephone and the rear edge of the front housing of said telephone,
   whereby the juncture between the rear housing and the front housing of the telephone is protected inside said backboard mounting enclosure.

9. The improved mounting pedestal of claim 8, wherein said upright post includes only one opening for telephone signal wiring from the interior of said upright post for provision through said backboard mounting enclosure, said telephone signal wiring extending from said telephone wiring channel in said upright post through said one opening in said upright post and into said telephone wiring channel of said backboard mounting enclosure, and thence to an opening in said support plate to said telephone.

10. The improved mounting pedestal of claim 8, wherein said upright post includes a plurality of power wiring knock-outs for power wiring from the interior of said upright post for provision through said backboard mounting enclosure, said power wiring extending from said power wiring channel in said upright post through an opening formed by removing a selected one of said power wiring knock-outs and into said power wiring channel of said backboard mounting enclosure, and thence to an opening in said backboard mounting enclosure for provision to an electrical utility for said telephone.

11. The improved mounting pedestal of claim 1, wherein backboard mounting enclosure is a first backboard mounting enclosure, and further comprising second mounting means on said upright post for mounting a second backboard mounting enclosure on said upright post on a side of said upright post opposing said first backboard mounting enclosure.

12. The improved mounting pedestal of claim 11, wherein said second mounting means comprises a plurality of knock-outs positioned on a side of said upright post opposite said first backboard mounting enclosure,
   said plurality of knock-outs being positioned so as to receive a second at least one backboard mounting channel for supporting said second backboard mounting enclosure.

13. An improved mounting pedestal for mounting a public or coin telephone, comprising:
   an elongate upright tubular post, said upright post including at least one temporary channel holding stud extending into the interior of said upright post at a position suitable for temporarily supporting a backboard mounting channel,
   said upright post including a plurality of variably spaced knock-outs, the spacing of said knock-outs being such that removal of a predetermined set of knock-outs provides a set of selected mounting holes for a backboard mounting enclosure at one of a plurality of predetermined mounting heights for said telephone;

base means for affixing said upright post to a mounting surface;

a backboard mounting enclosure for mounting said telephone in a secure manner at a selected height on said upright post;

at least one backboard mounting channel, said backboard mounting channel being generally U-shaped and including at least one permanent mounting stud and at least one temporary mounting hole, said temporary mounting hole being positioned to receive said temporary channel holding stud in said upright post and temporarily support said backboard mounting channel when said backboard mounting channel is placed into the interior of said upright post at a position corresponding to a selected height for said backboard mounting enclosure, said at least one permanent mounting stud extending through one of said selected mounting holes when said backboard mounting channel is temporarily supported in the interior of said upright post by said temporary channel holding stud, for receiving and supporting said backboard mounting enclosure; and means for securely holding said backboard mounting enclosure to said backboard mounting channel and said upright post.

14. The improved mounting pedestal of claim 13, wherein said upright post comprises a first wiring divider means for dividing the space on the inside of said upright post into a power wiring channel and a telephone wiring channel, said first wiring divider means extending the length of said upright post from the top of said upright post to a lower position toward the bottom of said upright post.

15. The improved mounting pedestal of claim 13, further comprising second wiring divider means in said backboard mounting enclosure for dividing the space on the inside of said backboard mounting enclosure into a power wiring channel and a telephone wiring channel, said second wiring divider means extending the length of said backboard mounting enclosure from the top of said backboard mounting enclosure to a lower position toward the bottom of said backboard mounting enclosure.

16. The improved mounting pedestal of claim 13, wherein said backboard mounting enclosure comprises:

a front wall including an opening for receiving a public or coin telephone, said opening being shaped to closely conform to the outer peripheral configuration of said telephone;

a back wall; and a support plate affixed to said back wall to which the rear housing of said telephone is secured, said support plate extending generally parallel to said front wall, spacing between said support plate and said front wall being greater than the spacing between the rear housing of said telephone and the rear edge of the front housing of said telephone, whereby the juncture between the rear housing and the front housing of the telephone is protected inside said backboard mounting enclosure.

17. The improved mounting pedestal of claim 16, wherein said upright post includes only one opening for telephone signal wiring from the interior of said upright post for provision through said backboard mounting enclosure, said telephone signal wiring extending from said telephone wiring channel in said upright post through said one opening in said upright post and into said telephone wiring channel of said backboard mounting enclosure, and thence to an opening in said support plate to said telephone.

18. The improved mounting pedestal of claim 16, wherein said upright post includes a plurality of power wiring knock-outs for power wiring from the interior of said upright post for provision through said backboard mounting enclosure, said power wiring extending from said power wiring channel in said upright post through an opening formed by removing a selected one of said power wiring knock-outs and into said backboard mounting enclosure, and thence to an opening in said backboard mounting enclosure for provision to an electrical utility for said telephone.

19. The improved mounting pedestal of claim 13, wherein plurality of variably spaced knock-outs is a first plurality of knock-outs, and wherein said upright post further includes a second plurality of knock-outs positioned on a side of said upright post opposite said first plurality of knock-outs, said second plurality of knock-outs being positioned so as to receive a second at least one of said backboard mounting channels for supporting a second backboard mounting enclosure.

20. An improved mounting pedestal for mounting a public or coin telephone, comprising:

an elongate upright tubular post, said upright post including at least one temporary channel holding stud extending into the interior of said upright post at a position suitable for temporarily supporting a backboard mounting channel, said upright post including a plurality of variably spaced knock-outs, the spacing of said knock-outs being such that removal of a predetermined set of knock-outs provides a set of selected mounting holes for a backboard mounting enclosure at one of a plurality of predetermined mounting heights for said telephone, said upright post further comprising a first wiring divider means for dividing the space on the inside of said upright post into a power wiring channel and a telephone wiring channel, said first wiring divider means extending the length of said upright post from the top of said upright post to a lower position toward the bottom of said upright post;

base means for affixing said upright post to a horizontal mounting surface;

a backboard mounting enclosure for mounting said telephone in a secure manner;

second wiring divider means in said backboard mounting enclosure for dividing the space on the inside of said backboard mounting enclosure into a power wiring channel and a telephone wiring channel, said second wiring divider means extending the length of said backboard mounting enclosure from the top of said backboard mounting enclosure to a lower position toward the bottom of said backboard mounting enclosure; and at least one backboard mounting channel, said mounting channel being generally U-shaped and including at least one permanent mounting stud and at least one temporary mounting hole, said temporary mounting hole being positioned to receive said temporary channel holding stud in said upright post and temporarily support said backboard mounting channel when said backboard mounting channel is placed into the interior of said upright post at a position corresponding to a selected height for said backboard mounting enclosure, said at least one permanent mounting stud extending through one of said selected mounting holes when said backboard mounting channel is temporarily supported in the interior of said upright post by said temporary channel holding stud, for receiving said backboard mounting enclosure and a threaded nut, said threaded nut securely holding said backboard mounting enclosure to said backboard mounting channel and said upright post when tightened.

21. The improved mounting pedestal of claim 20, wherein said backboard mounting enclosure comprises:

a front wall including an opening for receiving a public or coin telephone, said opening being shaped to closely conform to the outer peripheral configuration of said telephone;

a back wall;

a support plate affixed to said back wall to which the rear housing of said telephone is secured, said support plate extending generally parallel to said front wall, the spacing between said support plate and said front wall being greater than the spacing between the rear housing of said telephone and the rear edge of the front housing of said telephone, whereby the juncture between the rear housing and the front housing of the telephone is protected inside said backboard mounting enclosure.

22. The improved mounting pedestal of claim 21, wherein said upright post includes only one opening for telephone signal wiring from the interior of said upright post for provision through said backboard mounting enclosure, said telephone signal wiring extending from said telephone wiring channel in said upright post through said one opening in said upright post and into said telephone wiring channel of said backboard mounting enclosure, and thence to an opening in said support plate to said telephone.

23. The improved mounting pedestal of claim 22, wherein said upright post includes a plurality of power wiring knock-outs for power wiring from the interior of said upright post for provision through said backboard mounting enclosure, said power wiring extending from said power wiring channel in said upright post through an opening formed by removing a selected one of said power wiring knock-outs and into said backboard mounting enclosure, and thence to an opening in said backboard mounting enclosure for provision to an electrical utility for said telephone.

24. The improved mounting pedestal of claim 20, wherein plurality of variably spaced knock-outs is a first plurality of knock-outs, and wherein said upright post further includes a second plurality of knock-outs positioned on a side of said upright post opposite said first plurality of knock-outs, said second plurality of knock-outs being positioned so as to received a second at least one of said backboard mounting channels for supporting a second backboard mounting enclosure.

* * * * *